United States Patent
Feng (10) Patent No.: US 10,271,130 B2
(45) Date of Patent: Apr. 23, 2019

(54) SOUND ABSORBING MATERIAL AND MANUFACTURING METHOD THEREOF AND SPEAKER USING SOUND ABSORBING MATERIAL

(71) Applicant: Hongshu Feng, Shenzhen (CN)

(72) Inventor: Hongshu Feng, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/417,089

(22) Filed: Jan. 26, 2017

(65) Prior Publication Data

US 2018/0167721 A1   Jun. 14, 2018

(30) Foreign Application Priority Data

Dec. 13, 2016   (CN) .......................... 2016 1 1146775

(51) Int. Cl.
*H04R 1/28* (2006.01)
*C01B 39/46* (2006.01)
*G10K 11/165* (2006.01)
*G10K 11/00* (2006.01)

(52) U.S. Cl.
CPC ............. *H04R 1/288* (2013.01); *C01B 39/46* (2013.01); *G10K 11/002* (2013.01); *G10K 11/165* (2013.01)

(58) Field of Classification Search
USPC ....... 381/335, 342, 345, 353, 354, 368, 423; 181/148, 151, 156, 160, 163
See application file for complete search history.

(56) References Cited

U.S. PATENT DOCUMENTS

2015/0104364 A1*   4/2015   Elomari ............. B01D 53/9486
423/212
2016/0318299 A1*   11/2016   Arai ........................... B41J 2/01

\* cited by examiner

*Primary Examiner* — Yosef K Laekemariam
(74) *Attorney, Agent, or Firm* — Na Xu; IPro, PLLC (57) ABSTRACT

The present disclosure provides a sound absorbing material, a manufacturing method thereof and a speaker using the sound absorbing material. The speaker comprises a shell with a receiving space, a sound production unit disposed in the shell, and a rear cavity encircled by the sound production unit and the shell. The rear cavity is filled with a sound absorbing material. The sound absorbing material comprises MEL structured molecular sieves. The framework of the MEL structured molecular sieves comprises silicon dioxide.

13 Claims, 8 Drawing Sheets

SOUND ABSORBING MATERIAL AND MANUFACTURING METHOD THEREOF AND SPEAKER USING SOUND ABSORBING MATERIAL

FIELD OF THE DISCLOSURE

The present disclosure relates to the technical field of sound materials and, more particularly, to a sound absorbing material, a manufacturing method thereof and a speaker using the sound absorbing material.

BACKGROUND

With the development of science and technology, people have increasingly high requirements for speakers, particularly, for mobile phone speakers, required are not only small size and sound, but also both small size and good tone quality are required. The tone quality is related to each link of the design and manufacturing process of a speaker, particularly, to the size of the rear cavity of the speaker. Generally, if the rear cavity of the speaker is reduced, the response to low bands is obviously reduced, and the tone quality becomes worse, so it is difficult to provide good tone quality in the presence of a very small rear cavity.

The above technical problem is generally solved by adopting the following several methods: first, replacing air in the rear cavity with gas having better acoustic compliance; second, filling the rear cavity with foam like melamine to increase the acoustic compliance; and last, filling the rear cavity with a porous material such as active carbon, zeolite, silica and the like to increase the volume of the virtual rear cavity and improve the acoustic compliance. The effect of the third method is most obvious, the zeolite filled in the rear cavity at present mainly includes FER, MFI and BEA structured molecular sieves, and MEL structured molecular sieves have not been reported.

Therefore, it is necessary to provide the present disclosure to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Reference will now be made to describe an exemplary embodiment of the present invention in detail.

Figure 1:
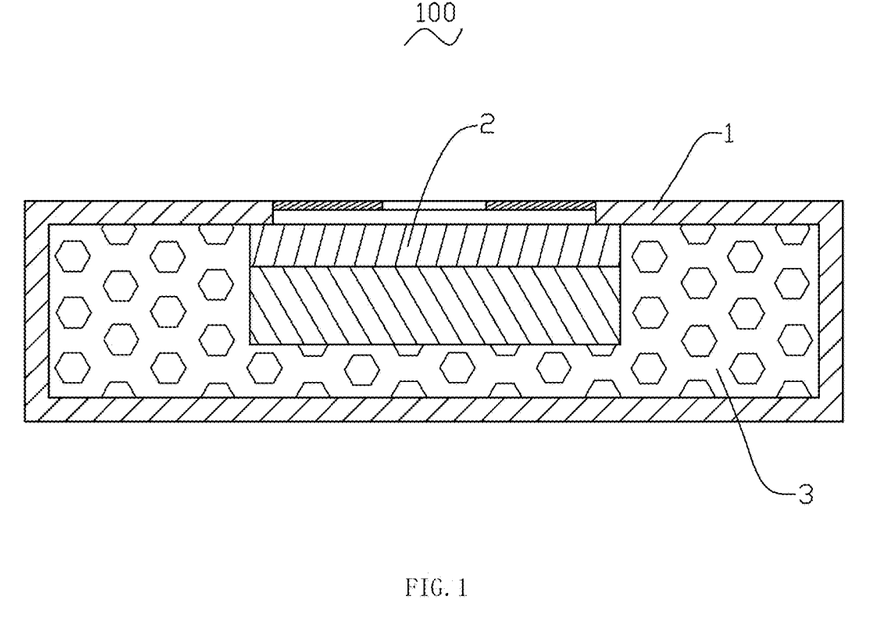
FIG. 1 is a structural schematic diagram of a speaker provided by the present disclosure.

Referring to FIG. 1, which is a structural schematic diagram of a speaker provided by the present disclosure, a speaker 100 is provided by the present disclosure, including a shell 1 with a receiving space, a sound production unit 2 disposed in the shell 1 and a rear cavity 3 encircled by the sound production unit 2 and the shell 1, wherein the rear cavity 3 is filled with a sound absorbing material for increasing the acoustic compliance of air in the rear cavity so as to improve the low-frequency performance of the speaker.

The sound absorbing material includes MEL structured molecular sieves, and the framework of the MEL structured molecular sieves includes silicon dioxide. When a diaphragm of the speaker vibrates up and down, the sound absorbing material can adsorb or desorb air in the inner cavity, thereby increasing the acoustic compliance of air in the rear cavity, reducing the resonance frequency of the closed space and improving the low-frequency performance. In the present disclosure, the MEL structured molecular sieves have uniform pores, and the pores adsorb or desorb air molecules under the action of sound pressure and thus can play a role in increasing the volume of the virtual acoustic cavity. With such performance, the MEL structured molecular sieves can be used as an ideal sound absorbing material for improving the acoustic compliance of the rear cavity of the speaker.

Further, the framework of the MEL structured molecular sieves further includes oxides of other elements M, wherein the molar ratio of the silicon element to the other elements M is at least 80. The other elements M include one or two or more of aluminum (Al), ferrum (Fe), boron (B), titanium (Ti) and zirconium (Zr). Generally, the framework of the MEL structured molecular sieves is mainly composed of silicon dioxide and aluminum oxide; if the molar ratio of the silicon element to the aluminum element is less than 80, moisture in air may be significantly adsorbed to occupy most passages of the pores of molecular sieves, so that no low-frequency improvement effect is achieved; if the molar ratio of the silicon element to the other elements M is less than 80 when the other elements M except the aluminum element are used, MEL structured molecular sieves are difficult to synthesize or the crystallization of the synthesized MEL structured molecular sieves becomes bad or is very bad. In addition, the molar ratio of the silicon element to the other elements M in the MEL structured molecular sieves is preferably more than 110.

In other embodiments, the MEL structured molecular sieves further include extra-framework cations, and thus can adsorb or desorb air in the cavity more effectively and improve the low-frequency performance better. The extra-framework cations include at least one kind of hydrogen ions, ammonium ions, alkali metal ions and alkali earth metal ions. Generally, as required, the MEL structured molecular sieves before use are exchanged with cations to form different types of MEL structured molecular sieves. An ammonium salt, an alkali metal salt or an alkali earth metal salt is generally exchanged with the MEL structured molecular sieves to obtain the extra-framework cations. The ammonium salt mainly includes ammonium chloride, ammonium nitrate, ammonium sulfate, ammonium carbonate, etc.; the alkali metal salt mainly includes lithium salt, sodium salt, potassium salt, rubidium salt, etc.; the anions of the alkali metal salt include chlorine ions, sulfate ions, nitrate ions, etc.; the alkali earth metal salt mainly includes magnesium salt, calcium salt, barium salt, etc.; and the anions of the alkali earth metal salt include chlorine ions, sulfate ions, nitrate ions, etc.

The sound absorbing material may be MEL structured molecular sieve powder or MEL structured molecular sieve particles, and is mainly disposed in the rear cavity 3 by filling. The MEL structured molecular sieves, which are used as the sound absorbing material for improving the acoustic compliance of the rear cavity, can be put into a relatively small cavity due to small size thereof, and are not limited by the packaging volume, thereby solving the problem that the acoustic cavity of the speaker is small and difficult to package the sound absorbing material. The MEL structured molecular sieves synthesized directly are generally in the form of powder having the particle diameters between 10 nanometers and 10 microns, and mostly need to form particles with certain size together with an adhesive, wherein the adhesive includes but not limited to inorganic adhesives and organic polymer adhesives; the inorganic adhesives mainly include active aluminum oxide, silica sol, etc.; and the organic polymer adhesives mainly include acrylate, epoxy adhesives, polyurethane, etc.

The MEL structured molecular sieves may be of a pure-phase MEL structure or an MEL and MFI mixed-phase structure under the influence of the synthetic condition.

The present disclosure further provides a manufacturing method of the sound absorbing material in the speaker, including the following steps:

step S1, synthesizing MEL structured molecular sieves, in which the molar ratio of the silicon element to other elements M is at least 80, from a silicon source, an M source, an alkali source, a template agent and water, wherein the silicon source includes tetraethoxysilane, silica sol and sodium silicate; the M source is determined according to the framework of the MEL structured molecular sieves; the alkali source includes sodium hydroxide, potassium hydroxide and lithium hydroxide; the template agent is tetrabutyl quaternary ammonium salt, which may be at least one of tetrabutyl ammonium bromide, tetrabutyl ammonium hydroxide, tetrabutyl ammonium chloride, tetrabutyl ammonium iodide and tetrabutyl ammonium fluoride;

step S2, washing, drying and pulverizing the MEL structured molecular sieves synthesized in step S1, and roasting the MEL structured molecular sieves to remove the template agent, wherein optionally, step S2 further includes a step of performing ion exchange of the MEL structured molecular sieves, from which the template agent is removed, with an ammonium salt, an alkali metal salt or an alkali earth metal salt; the ion exchange step is not necessary, and the ion exchange is performed on the MEL structured molecular sieves and the ammonium salt, the alkali metal salt or the alkali earth metal salt in order to obtain extra-framework cations;

step S3, mixing the MEL structured molecular sieves obtained in step S2 with a solvent, an adhesive and aids to prepare a suspended mixture, wherein the solvent mainly indicates water and various common organic solvents, e.g., ethanol, methylbenzene, acetone, tetrahydrofuran, etc.; the adhesive includes but not limited to inorganic adhesives and organic polymer adhesives; the inorganic adhesives mainly include active aluminum oxide, silica sol, etc.; the organic polymer adhesives mainly include acrylate, epoxy adhesives, polyurethane, etc; the aids are other matters added in a small amount which is generally less than 5%; and step S4, drying and granulating, wherein the suspended mixture prepared in step S3 is dried and granulated at a certain temperature.

The present disclosure will be interpreted below in combination with specific embodiments.

Embodiment 1

Figure 2:
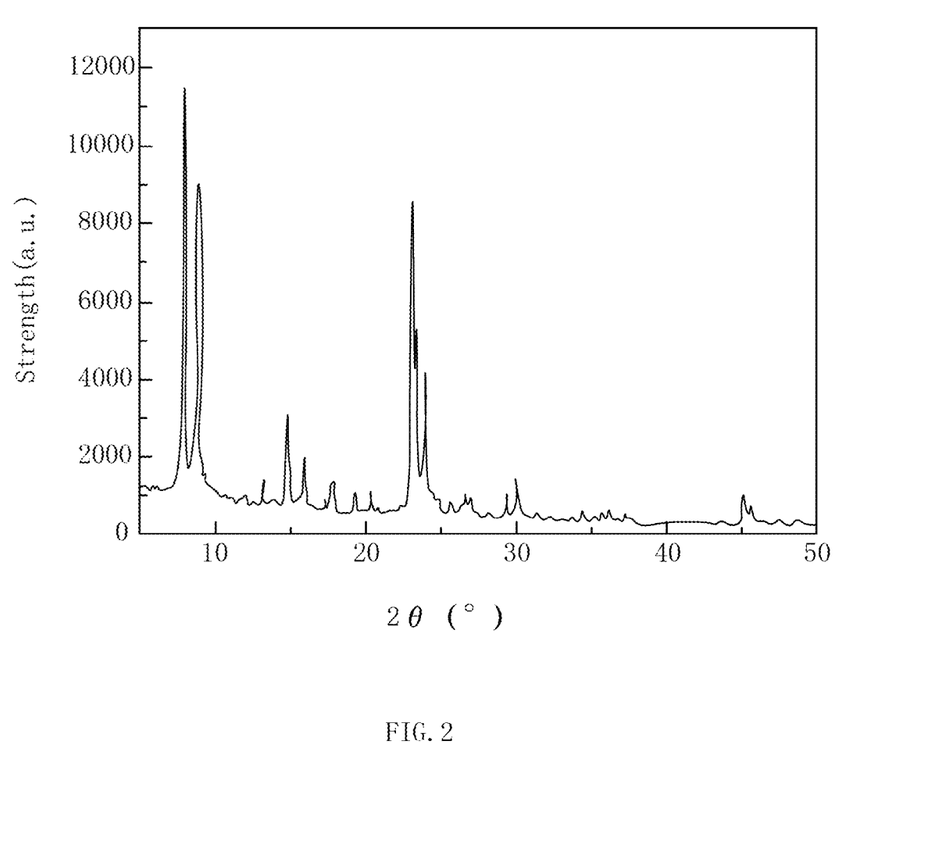
FIG. 2 is an XRD map of MEL and MFI mixed-phase structured molecular sieves of embodiment 1 of the present disclosure.
Figure 5:
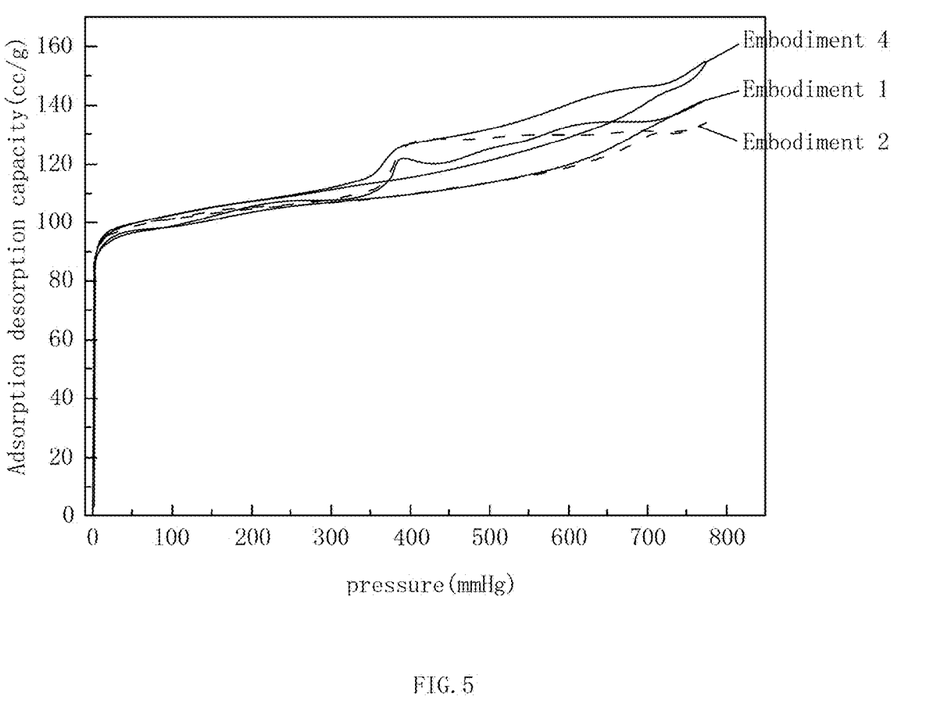
FIG. 5 is a low-temperature nitrogen adsorption comparison diagram of molecular sieves of embodiments 1, 2 and 4 of the present disclosure.
Figure 7:
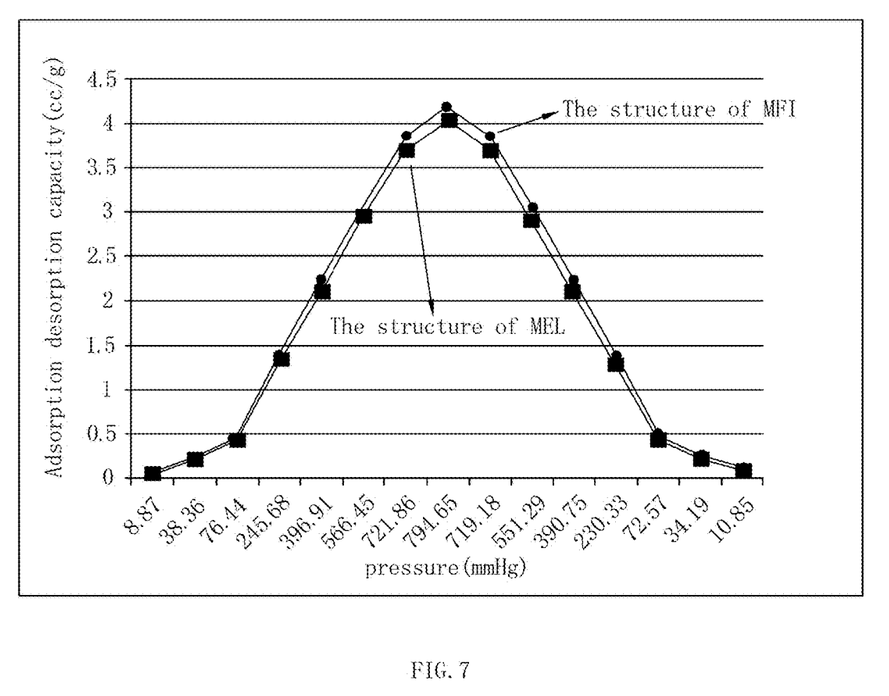
FIG. 7 is a normal-temperature nitrogen adsorption and desorption comparison diagram of molecular sieves of embodiments 1, 2 and 4 of the present disclosure.

The sound absorbing material of this embodiment includes MEL and MFI mixed-phase structured molecular sieves, which are prepared by the following method:

synthesizing the MEL and MFI mixed-phase structured molecular sieves, in which the molar ratio of the silicon element to the aluminum element is 250, from a silicon source (including tetraethoxysilane, silica sol and sodium silicate), an aluminum source (including aluminum nitrate, sodium metaaluminate and aluminum isopropoxide), an alkali source (including sodium hydroxide, potassium hydroxide and lithium hydroxide), a template agent which is tetrabutyl quaternary ammonium salt (at least one of tetrabutyl ammonium bromide, tetrabutyl ammonium hydroxide, tetrabutyl ammonium chloride, tetrabutyl ammonium iodide and tetrabutyl ammonium fluoride) and water, wherein the XRD map of the MEL and MFI mixed-phase structured molecular sieves is shown in FIG. 2, the low-temperature nitrogen adsorption characteristic is shown in FIG. 5, and the normal-temperature nitrogen adsorption and desorption are shown in FIG. 7.

Embodiment 2

The sound absorbing material of this embodiment includes MEL and MFI mixed-phase structured molecular sieves, which are prepared by the following method:

synthesizing the MEL and MFI mixed-phase structured molecular sieves, in which the molar ratio of the silicon element to the ferrum element is 300, from a silicon source (including tetraethoxysilane, silica sol and sodium silicate), a ferric source (including ferric nitrate, ferric sulfate and ferric chloride), an alkali source (including sodium hydroxide, potassium hydroxide and lithium hydroxide), a template agent which is tetrabutyl quaternary ammonium salt (at least one of tetrabutyl ammonium bromide, tetrabutyl ammonium hydroxide, tetrabutyl ammonium chloride, tetrabutyl ammonium iodide and tetrabutyl ammonium fluoride) and water, wherein the low-temperature nitrogen adsorption characteristic of the MEL and MFI mixed-phase structured molecular sieves is shown in FIG. 5.

Embodiment 3

The sound absorbing material of this embodiment includes pure-phase MEL structured molecular sieves.

Figure 3:
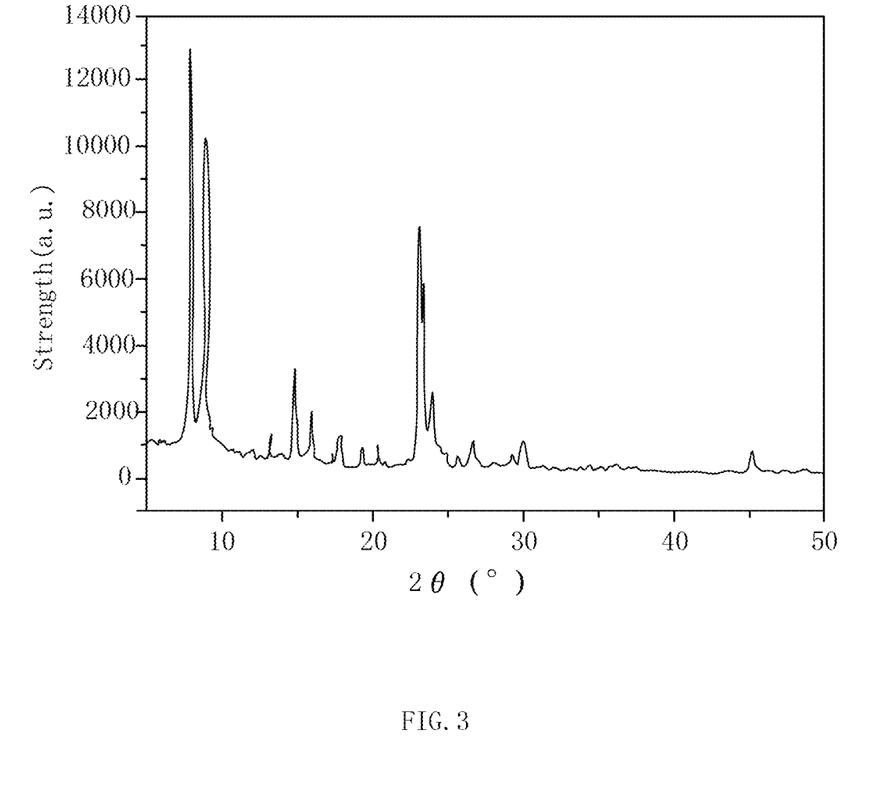
FIG. 3 is an XRD map of pure-phase MEL structured molecular sieves of embodiment 3 of the present disclosure.

The manufacturing method of the pure-phase MEL structured molecular sieves is as shown in embodiment 1, wherein the template agent is a compound template agent of a tetrabutyl quaternary ammonium salt and a benzyl trimethyl quaternary ammonium salt (the quaternary ammonium salt is as shown in embodiment 1), synthesized are the pure-phase MEL structured molecular sieves in which the molecular ratio of the silicon element to the aluminum element is 150, and the XRD map of the pure-phase MEL structured molecular sieves is shown in FIG. 3.

Embodiment 4

The sound absorbing material of this embodiment includes pure-phase MEL structured molecular sieves.

The manufacturing method of the pure-phase MEL structured molecular sieves is as shown in embodiment 1, wherein the template agent is a compound template agent of a tetrabutyl quaternary ammonium salt and a benzyl trimethyl quaternary ammonium salt (the quaternary ammonium salt is as shown in embodiment 1), synthesized are the pure-phase MEL structured molecular sieves in which the molecular ratio of the silicon element to aluminum and titanium elements is 150, and the low-temperature nitrogen adsorption characteristic of the pure-phase MEL structured molecular sieves is shown in FIG. 5.

Embodiment 5

The sound absorbing material of this embodiment includes pure-phase MEL structured molecular sieves.

The manufacturing method of the pure-phase MEL structured molecular sieves is as shown in embodiment 1, wherein the template agent is a compound template agent of a tetrabutyl quaternary ammonium salt and a benzyl trimethyl quaternary ammonium salt (the quaternary ammonium salt is as shown in embodiment 1), and synthesized are the pure-phase MEL structured molecular sieves in which the molecular ratio of the silicon element to other elements M is infinite (the content of the other elements M is less than 0.02 wt. %).

Embodiment 6

The pure-phase MEL structured molecular sieves obtained in embodiment 3 are exchanged with an acid or an ammonium salt to form a hydrogen type. The acid includes at least one of hydrochloric acid, sulfuric acid, nitric acid, acetic acid and tartaric acid; the ammonium salt includes at least one of ammonium chloride, ammonium sulfate and ammonium nitrate.

Embodiment 7

The pure-phase MEL structured molecular sieves obtained in embodiment 3 are exchanged with a lithium salt to form a lithium type. The lithium salt includes at least one of lithium chloride, lithium sulfate and lithium nitrate.

Embodiment 8

The pure-phase MEL structured molecular sieves obtained in embodiment 3 are exchanged with a sodium salt to form a sodium type. The sodium salt includes at least one of sodium chloride, sodium sulfate and sodium nitrate.

Embodiment 9

The pure-phase MEL structured molecular sieves obtained in embodiment 3 are exchanged with a potassium salt to form a potassium type.

The potassium salt includes at least one of potassium chloride, potassium sulfate and potassium nitrate.

Embodiment 10

The pure-phase MEL structured molecular sieves obtained in embodiment 3 are exchanged with a potassium salt and a sodium salt together to form a mixed potassium-sodium type. The potassium salt and the sodium salt are described in embodiment 8 and embodiment 9 above.

Embodiment 11

The MEL and MFI mixed-phase structured molecular sieves obtained in embodiment 1 are exchanged with a magnesium salt to form a magnesium type. The magnesium salt includes at least one of magnesium nitrate and magnesium sulfate.

Embodiment 12

The MEL and MFI mixed-phase structured molecular sieves obtained in embodiment 1 are exchanged with a magnesium salt and a sodium salt together to form a mixed magnesium-sodium type. The sodium salt and the magnesium salt are described in embodiment 8 and embodiment 11 above.

Comparative Example 1

Figure 4:
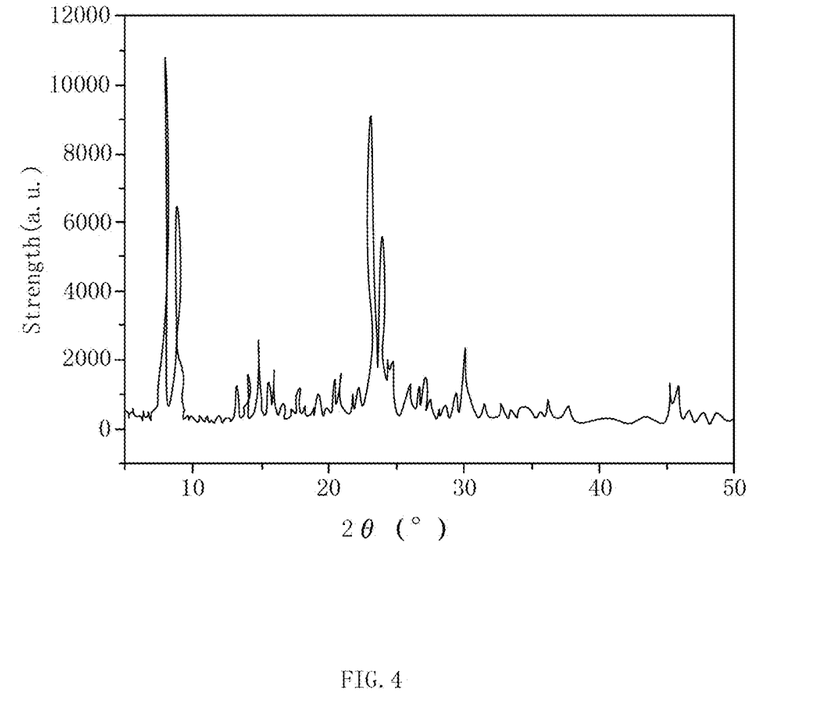
FIG. 4 is an XRD map of MFI structured molecular sieves of embodiment 1 of the present disclosure.
Figure 6:
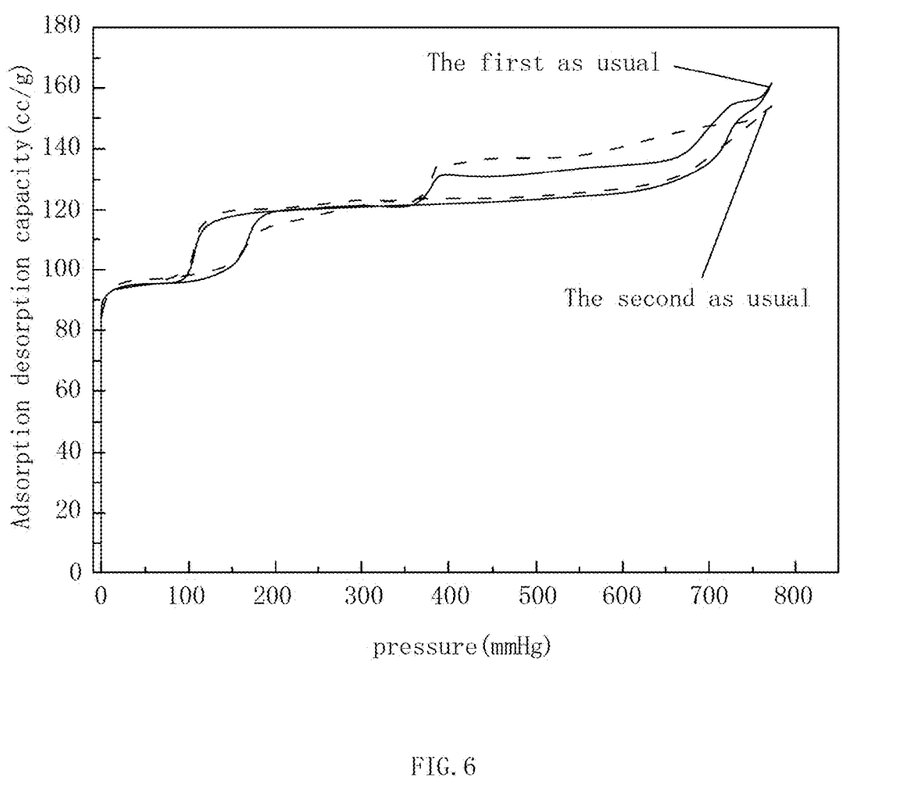
FIG. 6 is a low-temperature nitrogen adsorption comparison diagram of molecular sieves of embodiments 1 and 2 of the present disclosure.

As shown in embodiment 1, the template agent is changed into a tetrapropyl quaternary ammonium salt for synthesizing MFI structured molecular sieves, the XRD map is shown in FIG. 4, and the low-temperature nitrogen adsorption characteristic is shown in FIG. 6.

Comparative Example 2

The MFI structured molecular sieves obtained in comparative example 1 are exchanged with a potassium salt to form a potassium type. The potassium salt includes at least one of potassium chloride, potassium sulfate and potassium nitrate. The low-temperature nitrogen adsorption characteristic is shown in FIG. 6, and the normal-temperature nitrogen adsorption and desorption are shown in FIG. 7.

The molecular sieves synthesized in embodiments 1-12 and comparative examples 1-2 are respectively mixed with a solvent, an adhesive and aids to prepare a suspended mixture, the suspended mixture is dried and pulverized to obtain granular molecular sieves, then the molecular sieves are respectively filled into the rear cavity (the volume of the rear cavity of the fixture is 1 cubic centimeter, abbreviated as 1 cc) of the speaker for acoustic performance test, and the results are shown in table 1.

TABLE 1

Resonance frequency F0 and Q values before and after the molecular sieves are added into the rear cavity of the speaker

|  | The rear cavity of the speaker is not added with molecular sieves | | Added with 1 cc of molecular sieves | | Reduced value | |
| --- | --- | --- | --- | --- | --- | --- |
|  | F0 | Q value | F0 | Q value | ΔF0 | ΔQ value |
| Embodiment 1 | 778.5 | 2.31 | 568.2 | 1.12 | 210.3 | 1.09 |
| Embodiment 2 | 777.6 | 2.28 | 546.6 | 1.09 | 231.0 | 1.19 |
| Embodiment 3 | 779.1 | 2.31 | 560.4 | 1.24 | 218.7 | 1.07 |
| Embodiment 4 | 783.2 | 2.39 | 552.3 | 1.19 | 231.9 | 1.20 |
| Embodiment 5 | 779.1 | 2.33 | 566.4 | 1.29 | 212.7 | 1.04 |
| Embodiment 6 | 777.0 | 2.31 | 566.4 | 1.28 | 210.6 | 1.03 |
| Embodiment 7 | 779.5 | 2.31 | 564.1 | 1.32 | 215.4 | 0.99 |
| Embodiment 8 | 778.9 | 2.32 | 550.2 | 1.17 | 228.7 | 1.15 |
| Embodiment 9 | 779.7 | 2.39 | 543.4 | 1.15 | 236.3 | 1.24 |

TABLE 1-continued

Resonance frequency F0 and Q values before and after the molecular sieves are added into the rear cavity of the speaker

| | The rear cavity of the speaker is not added with molecular sieves | | Added with 1 cc of molecular sieves | | Reduced value | |
|---|---|---|---|---|---|---|
| | F0 | Q value | F0 | Q value | ΔF0 | ΔQ value |
| Embodiment 10 | 777.8 | 2.34 | 540.4 | 1.13 | 237.4 | 1.21 |
| Embodiment 11 | 779.6 | 2.32 | 561.3 | 1.16 | 218.3 | 1.16 |
| Embodiment 12 | 781.2 | 2.35 | 551.3 | 1.14 | 229.9 | 1.21 |
| Comparative example 1 | 779.1 | 2.33 | 556.4 | 1.29 | 222.7 | 1.04 |
| Comparative example 2 | 777.0 | 2.34 | 546.4 | 1.28 | 230.6 | 1.06 |

It can be obtained according to table 1 that after the rear cavity of the speaker is filled with the molecular sieves of embodiments 1-12 and comparative examples 1-2, the resonance frequency F0 and Q values of the speaker are greatly reduced.

Figure 8:
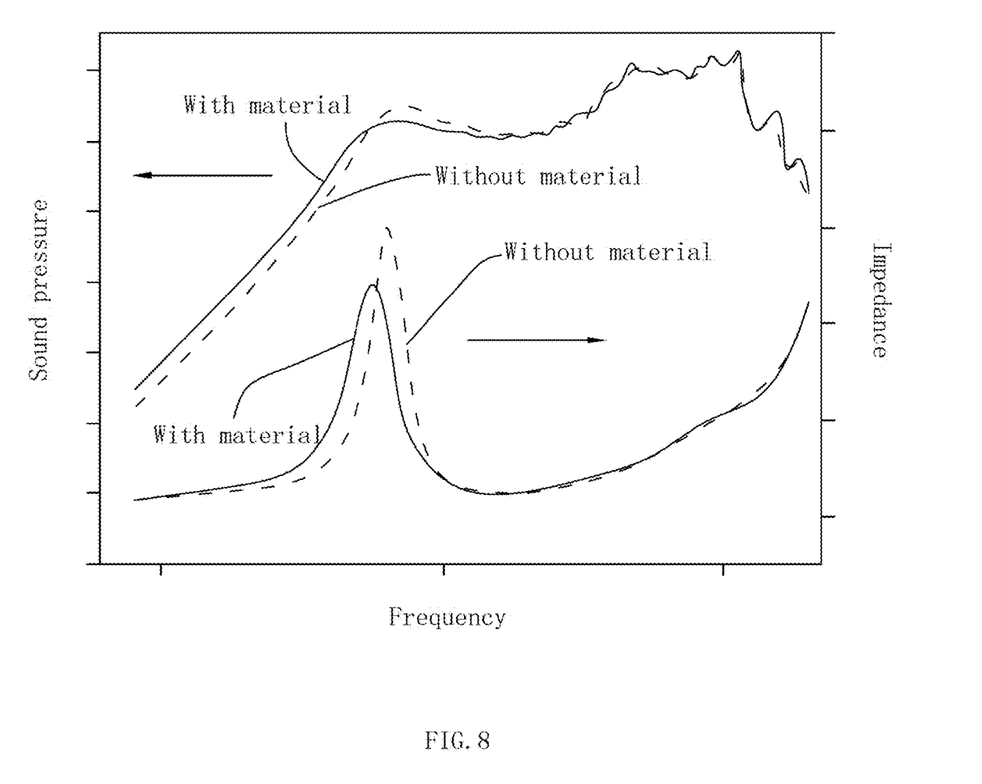
FIG. 8 is a comparison diagram of frequency response curves and impendence cures when MEL structured molecular sieves are added and not added to the rear cavity of the speaker.

FIG. 8 shows a comparison diagram of frequency response curves and impendence cures when MEL structured molecular sieves are added and not added into the rear cavity of the speaker. It can be obviously seen that after the MEL structured molecular sieves are added, the resonance significantly shifts to the low-frequency, the virtual acoustic volume is increased, and the attenuation is reduced at the same time.

The speaker provided by the present disclosure has the following advantages:

Firstly, the sound absorbing material includes MEL structured molecular sieves, the framework of the MEL structured molecular sieves includes silicon dioxide which has uniform pores, the pores adsorb or desorb air molecules under the action of sound pressure and thus can play a role in increasing the volume of the virtual acoustic cavity, and the MEL structured molecular sieves are filled into the rear cavity of the speaker, so that the low-frequency response of the speaker can be significantly improved, and the low-frequency acoustic performance of the speaker can be improved; and Secondly, the MEL structured molecular sieves, which are used as the sound absorbing material, can be put into a relatively small cavity due to small size thereof, thereby solving the problem that the acoustic cavity of the speaker is small and difficult to package the sound absorbing material, and meeting the requirement of development of the speaker for increasingly small volume.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sound absorbing material disposed in rear cavity of a speaker for adsorbing and desorbing gas contained within the rear cavity for improving acoustic compliance of the gas contained within the rear cavity and low-frequency performance of the speaker, comprising:
   MEL structured molecular sieves,
   wherein the MEL structured molecular sieves comprise a framework which comprises silicon dioxide.

2. The sound absorbing material according to claim 1, wherein the framework of the MEL structured molecular sieves further comprises oxides of other elements M, the other elements M comprise one or two or more of aluminum, ferrum, boron, titanium and zirconium, and the molar ratio of the silicon element to the other elements M is at least 80.

3. The sound absorbing material as described in claim 2, wherein the molar ratio of the silicon element to the other elements M in the MEL structured molecular sieves is more than 110.

4. The sound absorbing material as described in claim 1, wherein the MEL structured molecular sieves further comprise extra-framework cations, and the extra-framework cations comprise at least one kind of hydrogen ions, ammonium ions, alkali metal ions and alkali earth metal ions.

5. The sound absorbing material as described in claim 1, wherein the particle diameter of the MEL structured molecular sieves is more than 10 nanometers.

6. The sound absorbing material as described in claim 1, wherein the particle diameter of the MEL structured molecular sieves is less than 10 microns.

7. The sound absorbing material as described in claim 1, wherein the MEL structured molecular sieves have a pure-phase MEL structure or an MEL and MFI mixed-phase structure.

8. A speaker, comprising:
   a shell with a receiving space,
   a sound production unit, which disposed in the shell, and
   a rear cavity encircled by the sound production unit and the shell,
   wherein the rear cavity is filled with a sound absorbing material according to claim 1 for adsorbing and desorbing gas contained within the rear cavity for improving acoustic compliance of the as contained within the rear cavity and low-frequency performance of the speaker.

9. The sound absorbing material as described in claim 2, wherein the MEL structured molecular sieves have a pure-phase MEL structure or an MEL and MFI mixed-phase structure.

10. The sound absorbing material as described in claim 3, wherein the MEL structured molecular sieves have a pure-phase MEL structure or an MEL and MFI mixed-phase structure.

11. The sound absorbing material as described in claim 4, wherein the MEL structured molecular sieves have a pure-phase MEL structure or an MEL and MFI mixed-phase structure.

12. The sound absorbing material as described in claim 5, wherein the MEL structured molecular sieves have a pure-phase MEL structure or an MEL and MFI mixed-phase structure.

13. The sound absorbing material as described in claim 6, wherein the MEL structured molecular sieves have a pure-phase MEL structure or an MEL and MFI mixed-phase structure.

* * * * *